United States Patent
Zhu et al.

(10) Patent No.: US 11,824,615 B2
(45) Date of Patent: Nov. 21, 2023

(54) BEAM WEIGHT OBTAINING METHOD AND APPARATUS

(71) Applicant: HUAWEI TECHNOLOGIES CO., LTD., Shenzhen (CN)

(72) Inventors: Xudong Zhu, Shanghai (CN); Boya Qin, Shanghai (CN); Youtuan Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 92 days.

(21) Appl. No.: 17/471,648

(22) Filed: Sep. 10, 2021

(65) Prior Publication Data

US 2021/0409099 A1    Dec. 30, 2021

Related U.S. Application Data

(63) Continuation of application No. PCT/CN2020/079338, filed on Mar. 13, 2020.

(30) Foreign Application Priority Data

Mar. 15, 2019 (CN) .......................... 201910199119.9

(51) Int. Cl.
H04B 7/08 (2006.01)

(52) U.S. Cl.
CPC ........... *H04B 7/0857* (2013.01); *H04B 7/086* (2013.01); *H04B 7/088* (2013.01); *H04B 7/0865* (2013.01)

(58) Field of Classification Search
CPC .... H04B 7/0857; H04B 7/086; H04B 7/0865; H04B 7/088; H04B 7/0617; H04B 7/0408;
(Continued)

(56) References Cited

U.S. PATENT DOCUMENTS 7,340,017 B1 * 3/2008 Banerjee ............... H04B 1/7117
                                                           375/348
10,476,539 B1 * 11/2019 Berger ................. H04B 7/0885
(Continued)

FOREIGN PATENT DOCUMENTS

CN       101908918 A    12/2010
CN       102118825 A     7/2011
(Continued)

OTHER PUBLICATIONS

VIVO. "Discussion on Enhancements on Multi-Beam Operation." 3GPP TSG RAN WG1 Meeting #95, Spokane, USA. Nov. 12-16, 2018. R1-1812324. 10 pages.

*Primary Examiner* — Kenneth T Lam
(74) *Attorney, Agent, or Firm* — Maier & Maier, PLLC

(57) ABSTRACT

A beam weight obtaining method and an apparatus. An aggregation path is generated by using energy of a plurality of paths to help improve quality of a generated beam, thereby improving an SNR and a capacity of a terminal device. The method includes: a network device obtains a plurality of paths that meet a multipath aggregation condition, where the multipath aggregation condition includes one or more of the following conditions: a condition that every two paths in the plurality of paths need to meet in space, and a condition that every two paths in the plurality of paths need to meet in power. The network device determines aggregation information based on the plurality of paths, where the aggregation information includes information required by the network device to generate an aggregation path corresponding to the plurality of paths.

19 Claims, 5 Drawing Sheets

300

(58) Field of Classification Search
CPC ..... H04W 24/10; H04W 40/10; H04W 16/28; H04W 24/08; H04L 45/245
See application file for complete search history.

(56) References Cited

U.S. PATENT DOCUMENTS

| | | | |
|---|---|---|---|
| 2009/0295636 A1* | 12/2009 | Taniguchi | H04B 7/0894 342/378 |
| 2014/0334564 A1* | 11/2014 | Singh | H04B 7/0413 375/267 |
| 2015/0289147 A1* | 10/2015 | Lou | H04B 7/0452 370/329 |
| 2016/0315686 A1* | 10/2016 | Song | H04B 7/086 |
| 2017/0019154 A1* | 1/2017 | Reed | H04B 7/0413 |
| 2017/0331544 A1* | 11/2017 | Athley | H04B 7/0417 |
| 2018/0062979 A1* | 3/2018 | Zee | H04L 45/245 |
| 2019/0312698 A1* | 10/2019 | Akkarakaran | H04L 5/0048 |
| 2020/0274597 A1* | 8/2020 | Chen | H04W 24/10 |

FOREIGN PATENT DOCUMENTS

| | | |
|---|---|---|
| CN | 103650364 A | 3/2014 |
| CN | 106559102 A | 4/2017 |
| CN | 108011657 A | 5/2018 |
| CN | 108347265 A | 7/2018 |
| CN | 109120316 A | 1/2019 |
| WO | 2018098701 A1 | 6/2018 |
| WO | 2018215974 A1 | 11/2018 |

\* cited by examiner

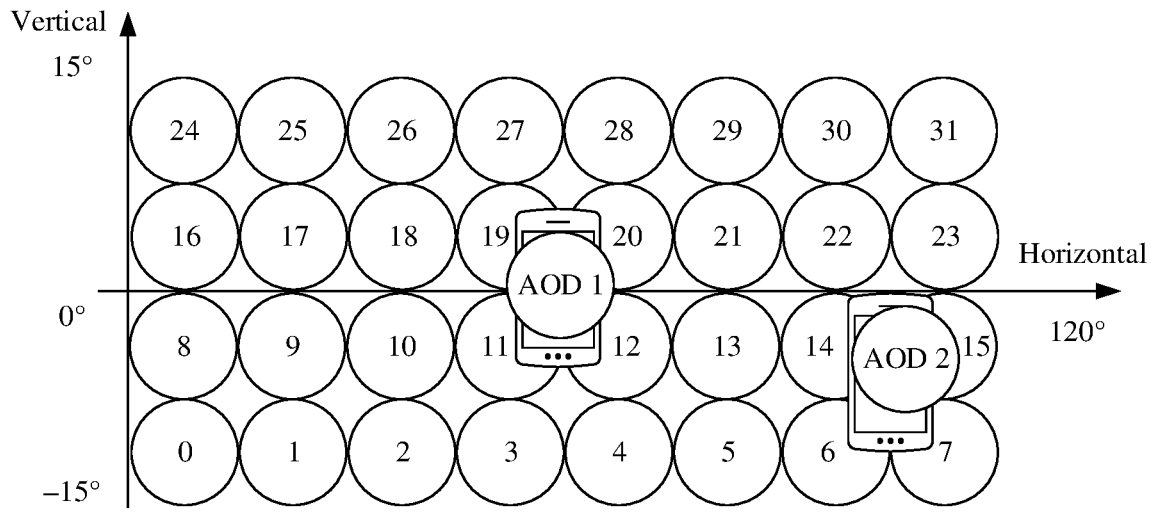

A network device obtains a plurality of paths that meet a multipath aggregation condition, where the multipath aggregation condition includes one or more of the following conditions: a condition that every two paths in the plurality of paths need to meet in space, and a condition that every two paths in the plurality of paths need to meet in power ~ S310

The network device determines aggregation information based on the plurality of paths, where the aggregation information includes information required by the network device to generate an aggregation path corresponding to the plurality of paths ~ S320

FIG. 4

BEAM WEIGHT OBTAINING METHOD AND APPARATUS

CROSS-REFERENCE TO RELATED APPLICATIONS

This application is a continuation of International Application No. PCT/CN2020/079338, filed on Mar. 13, 2020, which claims priority to Chinese Patent Application No. 201910199119.9, filed on Mar. 15, 2019. The disclosures of the aforementioned applications are hereby incorporated by reference in their entireties.

TECHNICAL FIELD

The embodiments relate to the communications field, and more specifically, to a beam weight obtaining method and an apparatus.

BACKGROUND

An above-6 GHz millimeter wave (mmWave) frequency band is introduced to new radio (NR). Common frequencies include 28 GHz, 39 GHz, 60 GHz, and the like. The mmWave frequency band is used in wireless mobile communication. A short wavelength results in fast signal attenuation when a signal propagates in space. In addition, an mmWave antenna has a small size (where the size of the antenna is in direct proportion to the wavelength). To make use of the advantage, an antenna array is usually used on a base station (BS) side for beamforming (BF), so that energy of signals is converged in space, and the signals precisely point to a direction of user equipment (UE), thereby improving a received signal-to-noise ratio (SNR) of the UE.

During non-line-of-sight (NLOS) transmission, a line-of-sight (LOS) transmission path between the BS and the UE is blocked, but there are usually a plurality of reflection paths (for example, $[\phi_1, \theta_1]$ and $[\phi_2, \theta_2]$) in space, and energy of the reflection paths is similar. In a current technology, the BS scans beams in a beam codebook one by one. The UE calculates an RSRP of each beam and feeds back IDs and RSRPs of K beams having highest RSRPs to the BS. The BS estimates a beam weight of a strongest path based on content reported by the UE, and generates a beam that is aligned with an AOD 1 of the strongest path. However, the beam obtained in this manner does not fully utilize the content reported by the UE. Therefore, a beam generation method needs to be proposed, to further improve quality of a generated beam.

SUMMARY

In view of this, the embodiments provide a beam weight obtaining method and an apparatus. An aggregation path is generated by using energy of a plurality of paths, to help improve quality of a generated beam, thereby improving an SNR and a capacity of a terminal device.

According to a first aspect, a beam weight obtaining method is provided. The method includes: a network device obtains a plurality of paths that meet a multipath aggregation condition, where the multipath aggregation condition includes one or more of the following conditions: a condition that every two paths in the plurality of paths need to meet in space, and a condition that every two paths in the plurality of paths need to meet in power. The network device determines aggregation information based on the plurality of paths, where the aggregation information includes information required by the network device to generate an aggregation path corresponding to the plurality of paths. The network device may generate a beam weight based on the aggregation information. By using the beam weight obtained in this manner, an SNR and a capacity of a terminal device can be improved.

In a possible implementation, the aggregation information includes phase difference information. The method further includes: the network device sends a downlink reference signal to the terminal device, where the downlink reference signal is used by the terminal device to measure the plurality of paths. The network device receives measurement information from the terminal device. The network device determines the phase difference information based on the measurement information. The network device performs, based on the phase difference information, phase compensation on a path corresponding to the phase difference information. Herein, the network device may determine the phase difference information based on the measurement information fed back by the terminal device, and perform phase compensation. In this way, paths obtained after compensation are in a same direction, so that the plurality of paths may be aggregated.

In a possible implementation, the measurement information includes the phase difference information determined by the terminal device. Alternatively, the measurement information includes a vector index determined by the terminal device, where the vector index is used to indicate a vector corresponding to the plurality of paths. That the network device determines the phase difference information based on the measurement information includes: the network device searches for, based on the vector index, the vector corresponding to the plurality of paths, and determines the phase difference information based on the vector corresponding to the plurality of paths. Herein, the network device may directly obtain the phase difference information determined by the terminal device. Alternatively, the network device may obtain the vector index fed back by the terminal device, search for, based on the vector index, the vector corresponding to the plurality of paths, and calculate a phase difference by using the vector corresponding to the plurality of paths.

In a possible implementation, the aggregation information includes phase difference information. The method further includes: the network device obtains the phase difference information in a sampling traversal manner.

Optionally, that the network device obtains the phase difference information in a sampling traversal manner includes:

The network device traverses phase differences in a preset phase difference sampling range for each path, and separately calculates beam weights of a plurality of aggregation paths. The network device receives a beam quality measurement result from a terminal device, where the beam quality measurement result includes a result obtained after the terminal device measures beam quality corresponding to a beam weight of each aggregation path in the beam weights of the plurality of aggregation paths. The network device selects, based on the beam quality measurement result, a beam weight of an aggregation path having best beam quality from the beam weights of the plurality of aggregation paths. The network device uses, as the phase difference information, a plurality of sampling phase differences corresponding to the beam weight of the aggregation path having the best beam quality. Therefore, the network device may traverse the phase differences in preset phase difference sampling range, calculate the beam weights of the aggregation paths, then select the beam weight of the aggregation path having the best beam quality, and use, as the phase difference information, the sampling phase differences corresponding to the beam weight of the aggregation path having the best beam quality.

Optionally, the aggregation information further includes a beam weight corresponding to the path and a power allocation coefficient corresponding to the path. The method further includes: the network device obtains angle information, phase information, and energy information of each path in the plurality of paths. The network device determines, based on the angle information and the phase information of the path, the beam weight corresponding to the path. The network device determines, based on the energy information of the path, the power allocation coefficient corresponding to the path. Herein, the aggregation information may include related information about the path, to facilitate subsequent calculation of the beam weight of the aggregation path.

In a possible implementation, the method further includes: the network device performs normalization calculation on the beam weight corresponding to the path, the power allocation coefficient corresponding to the path, and the phase difference information, to generate the beam weight corresponding to the aggregation path. Therefore, after obtaining the aggregation information, the network device may calculate the beam weight in a normalization manner based on the aggregation information.

Optionally, that the network device performs normalization calculation on the beam weight corresponding to the path, the power allocation coefficient corresponding to the path, and the phase difference corresponding to the path, to generate the beam weight corresponding to the aggregation path includes:

The network device calculates the beam weight corresponding to the aggregation path according to the following formula:

$$f_{L_0} = Q\left(\sum_{l=1}^{L_0} \beta_l * e^{j\Box \psi_l} * q_l\right),$$

where $f_{L_0}$ represents the beam weight corresponding to the aggregation path, $Q(\cdot)$ represents a normalization function, $\beta_l$ represents a power allocation parameter of an $l^{th}$ path, $$\beta_l = \frac{|\alpha_l|}{\sum_{i=1}^{L_0} |\alpha_i|}, 1 \leq l \leq L_0,$$

$\alpha_l$ represents energy of the $l^{th}$ path, $q_l$ represents a beam weight of the $l^{th}$ path, and $\Box \psi_l$ represents a phase difference between the $l^{th}$ path and an $l^{th}$ path.

Optionally, the condition that every two paths in the plurality of paths need to meet in space includes: a spatial angle between every two paths in the plurality of paths is greater than or equal to an angle threshold.

Optionally, the condition that every two paths in the plurality of paths need to meet in power includes: a power difference between every two paths in the plurality of paths is less than a power threshold.

Optionally, that a spatial angle between every two paths in the plurality of paths is greater than or equal to an angle threshold is determined according to the following formula:

$$\sqrt{(\phi_x-\phi_y)^2+(\theta_x-\theta_y)^2} \geq \eta_{th}, \text{ where}$$

$\eta_{th}$ represents a distance threshold, $\phi_x$ represents a horizontal angle of an $x^{th}$ path, $\theta_x$ represents a vertical angle of the $x^{th}$ path, $\phi_y$ represents a horizontal angle of a $y^{th}$ path, and $\theta_y$ represents a vertical angle of the $y^{th}$ path, and the $x^{th}$ path and the $y^{th}$ path are any two paths in the plurality of paths.

Optionally, that a power difference between every two paths in the plurality of paths is less than a power threshold is determined according to the following formula:

$$||\alpha_x|-|\alpha_t||<\zeta_{th}, \text{ where}$$

$\zeta_{th}$ represents the power threshold, $|\alpha_x|$ represents an absolute value of energy of the $x^{th}$ path, and $|\alpha_y|$ represents an absolute value of energy of the $y^{th}$ path.

According to a second aspect, a beam weight obtaining method is provided. The method includes: a terminal device receives a downlink reference signal from a network device, where the downlink reference signal is used by the terminal device to measure a plurality of paths. The terminal device sends measurement information to the network device, where the measurement information is used by the network device to determine phase difference information. Therefore, the terminal device sends the measurement information to the network device. This helps the network device determine the phase difference information. The phase difference information is included in aggregation information, so that the network device can generate a beam weight of an aggregation path based on the aggregation information.

Optionally, the measurement information includes the phase difference information determined by the terminal device. Therefore, the terminal device may directly determine the phase difference information.

Optionally, the measurement information includes a vector index determined by the terminal device, where the vector index is used to indicate a vector corresponding to the plurality of paths. Therefore, the terminal device may feed back the vector index to the network device, so that the network device determines, based on the vector index, the vector corresponding to the plurality of paths, and then determines the phase difference information based on the vector corresponding to the plurality of paths.

According to a third aspect, a communications apparatus is provided. The communications apparatus includes modules configured to perform the method in any one of the first aspect or the possible implementations of the first aspect, or modules configured to perform the method in any one of the second aspect or the possible implementations of the second aspect.

According to a fourth aspect, a communications apparatus is provided. The communications apparatus may be the network device in the foregoing method implementations or may be a chip disposed in the network device. The communications apparatus includes a processor that is coupled to a memory, and the processor may be configured to execute instructions in the memory, to implement the method performed by the network device in any one of the first aspect and the possible implementations of the first aspect. Optionally, the communications apparatus further includes the memory. Optionally, the communications apparatus further includes a communications interface. The processor is coupled to the communications interface.

When the communications apparatus is the network device, the communications interface may be a transceiver or an input/output interface.

When the communications apparatus is the chip disposed in the network device, the communications interface may be an input/output interface.

Optionally, the transceiver may be a transceiver circuit. Optionally, the input/output interface may be an input/output circuit.

According to a fifth aspect, a communications apparatus is provided. The communications apparatus may be the terminal device in the foregoing method implementations or may be a chip disposed in the terminal device. The communications apparatus includes a processor that is coupled to a memory, and the processor may be configured to execute instructions in the memory, to implement the method performed by the terminal device in any one of the second aspect and the possible implementations of the second aspect. Optionally, the communications apparatus further includes the memory. Optionally, the communications apparatus further includes a communications interface. The processor is coupled to the communications interface.

When the communications apparatus is the terminal device, the communications interface may be a transceiver or an input/output interface.

When the communications apparatus is the chip disposed in the terminal device, the communications interface may be an input/output interface.

Optionally, the transceiver may be a transceiver circuit. Optionally, the input/output interface may be an input/output circuit.

According to a sixth aspect, a program is provided. The program is executed by a processor to perform the method in any one of the first aspect, the second aspect, or the possible implementations of the first aspect or the second aspect.

According to a seventh aspect, a program product is provided. The program product includes program code. When the program code is run by a communications unit and a processing unit, or a transceiver and a processor of a communications apparatus (for example, a network device), a communications device is enabled to perform the method according to any one of the first aspect and the possible implementations of the first aspect.

According to an eighth aspect, a program product is provided. The program product includes program code. When the program code is run by a communications unit and a processing unit, or a transceiver and a processor of a communications apparatus (for example, a terminal device), a communications device is enabled to perform the method according to any one of the second aspect and the possible implementations of the second aspect.

According to a ninth aspect, a computer-readable storage medium is provided. The computer-readable storage medium stores a program, and the program enables a communications apparatus (for example, a network device) to perform the method according to any one of the first aspect and the possible implementations of the first aspect.

According to a tenth aspect, a computer-readable storage medium is provided. The computer-readable storage medium stores a program, and the program enables a communications apparatus (for example, a terminal device) to perform the method according to any one of the second aspect and the possible implementations of the second aspect.

BRIEF DESCRIPTION OF DRAWINGS

FIG. 3 is a schematic diagram of a current technology;

FIG. 4 is a schematic flowchart of a beam weight obtaining method according to an embodiment;

DETAILED DESCRIPTION OF THE EMBODIMENTS

Figure 1:
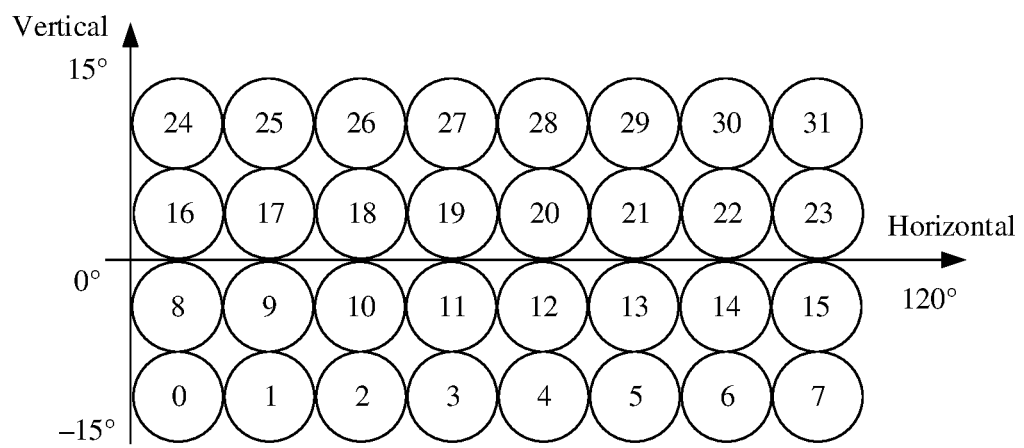
FIG. 1 is a schematic diagram of a beam scanned by a network device.

The following describes solutions with reference to the accompanying drawings.

The solutions of embodiments may be used in various communications systems, such as a global system for mobile communications (GSM) system, a code division multiple access ( ) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments.

A network device in the embodiments may be a device configured to communicate with the terminal device. The network device may be a base transceiver station (BTS) in the global system for mobile communications (GSM) system or the code division multiple access (CDMA) system, a NodeB (NodeB, NB) in the WCDMA system, an evolved NodeB (eNB or eNodeB) in the LTE system, or a radio controller in a cloud radio access network (CRAN) scenario. The network device may alternatively be a relay node, an access point, a vehicle-mounted device, a wearable device, a network device in the future 5G network, a network device in the future evolved PLMN network, or the like. This is not limited in the embodiments.

In the embodiments, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in the embodiments is not limited in the embodiments provided that a program that records code for the method provided in the embodiments can be run to perform communication according to the method provided in the embodiments. For example, the execution body of the method provided in the embodiments may be the terminal device, the network device, or a function module that is in the terminal device or the network device and that can invoke and execute the program.

In addition, aspects or features may be implemented as a method, an apparatus, or a product that uses standard programming and/or engineering technologies. The term "product" covers a computer program that can be accessed from any computer-readable component, carrier or medium. For example, a computer-readable medium may include, but is not limited to: a magnetic storage component (for example, a hard disk, a floppy disk, or a magnetic tape), an optical disc (for example, a compact disc (CD) or a digital versatile disc (DVD)), or a smart card and a flash memory component (for example, an erasable programmable read-only memory (EPROM), a card, a stick, or a key drive). In addition, various storage media described may indicate one or more devices and/or other machine-readable media that are configured to store information. The term "machine-readable media" may include, but is not limited to, a radio channel, and various other media that can store, contain, and/or carry instructions and/or data.

For ease of understanding, the following briefly describes some terms or concepts in the embodiments.

A signal radiates from an antenna at a transmit end, propagates in space through an electromagnetic field, and is received by an antenna at a receive end. The signal is transmitted in space through an electromagnetic wave, and for the electromagnetic wave, there are usually a plurality of paths from the transmit end to the receive end in space.

Beam: The beam is a space resource, and a key technology used for the beam is a multi-antenna technology. A single antenna can receive signals from a large space range (transmit signals to a large space range). When a plurality of antennas are arranged together, by adjusting amplitudes and phases of the signals on the antenna, transmit signals can be concentrated in one direction and signals in other directions become weaker (received signals in one direction become stronger and signals in other directions become weaker). The beam may be a wide beam, a narrow beam, or another type of beam. A technology for forming the beam may be a beamforming technology or another technology. The beamforming technology may be a digital beamforming technology, an analog beamforming technology, or a hybrid digital/analog beamforming technology. Different beams may be considered as different resources. The different beams are used to divide space into a plurality of independent transmission paths, namely, different communication resources (space division multiplexing). Same information or different information may be sent on the different beams. Optionally, a plurality of beams having a same communication feature or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution of signal strength, in different directions in space, of a radio signal received from an antenna. It may be understood that, the one or more antenna ports forming one beam may also be considered as one antenna port set. In a protocol, the beam can also be embodied as a spatial filter.

Beam quality: The beam quality may be measured by using a measurement indicator such as a reference signal received power (RSRP), a block error rate (BLER), a reference signal received quality (RSRQ), a reference signal received strength indicator (RSSI), a signal to interference plus noise ratio (SINR), a signal quality indicator (CQI), and correlation. It should be understood that a beam quality measurement indicator is not limited in the embodiments.

To improve coverage and a capacity of a millimeter wave frequency band, the network device forms an extremely narrow beam, so that energy of signals is converged in a direction of the terminal device. A beam shown in FIG. 1 is used as an example. The network device scans 32 beams (a total of M=32 beams in four rows and eight columns) shown in FIG. 1. Each beam corresponds to a group of weights of N antenna elements (where N=64 when there are eight rows and eight columns). A weight of a beam i is $f_i=[f_{i,1}\ f_{i,2}\ \cdots\ f_{i,N}]$, where $f_{i,k}$ is an amplitude and phase value on an antenna element k when the beam i is to be generated. The terminal device compares reference signal received powers RSRPs corresponding to the M=32 beams, to determine K optimal beams and feeds back beam IDs and RSRPs corresponding to the K beams to the network device. The network device directly selects an optimal beam as a beam for data transmission. Alternatively, the network device estimates an angle of departure (angle of departure, AOD) [ϕ, θ] (where ϕ∈[0,2π] represents a horizontal angle, and θ∈[0, π] represents a vertical angle) on a network device side, and then generates a beam used for dynamic pointing, so that the beam is accurately aligned with the terminal device. A weight of the beam generated by the network device is represented by $f_{[\phi,\theta]}=[f_{[\phi,\theta],1}\ f_{[\phi,\theta],2}\ \cdots\ f_{[\phi,\theta],N}]$, where $f_{[\phi,\theta],k}$ is an amplitude and phase value on an antenna element k when the network device generates the beam that points to [ϕ, θ].

Usually, a propagation condition of a wireless communications system is classified into two environments: non-line-of-sight (NLOS) transmission (also referred to as non-line-of-sight) and line-of-sight (LOS) transmission (also referred to as line-of-sight). In the LOS environment, a radio signal is propagated in a straight line at a transmit/receive end without being blocked. When there are obstacles, the radio signal arrives at the receive end through reflection, scattering, and diffraction.

Figure 2:
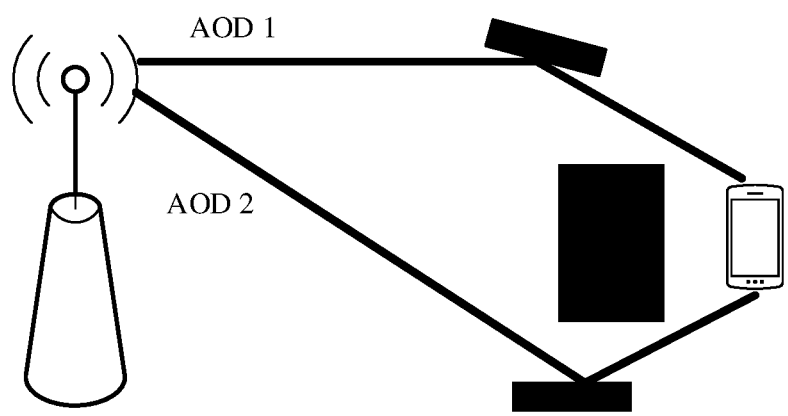
FIG. 2 is a diagram of a scenario to which an embodiment is applied.

FIG. 2 is a diagram of a scenario to which an embodiment is applied. As shown in FIG. 2, during NLOS transmission, a LOS transmission path between a network device and a terminal device is blocked, but there are usually a plurality of reflection paths (for example, a path corresponding to an angle of departure AOD 1 [ϕ$_1$, θ$_1$] and a path corresponding to an angle of departure AOD 2 [ϕ$_2$, θ$_2$] in FIG. 2) in space, and energy of the reflection paths is similar.

Herein, the method in a current technology is briefly described with reference to FIG. 3. As shown in FIG. 3, UE feeds back K=4 optimal beams, and beam IDs arranged in descending order of RSRPs are respectively 20, 15, 19, and 12. In this case, a BS may estimate [ϕ$_1$, θ$_1$] of a strongest path, for example, perform interpolation estimation by using the beam IDs and the RSRPs (for example, by using a classical amplitude comparison-based angle estimation algorithm in a radar field), to obtain an estimation value of the AOD 1 of the strongest path, namely, $[\phi_1, \theta_1]=[60°, 0°]$. The BS may generate a beam $f_{[\phi_1,\theta_1]}$ that is aligned with the AOD 1 of the strongest path, to transmit data. For a beam obtained in this manner, an SNR on a UE side needs to be further improved.

To improve the SNR and a capacity on the UE side, the embodiments provides a beam weight obtaining method. An optimal beam is generated by using energy of a plurality of paths, to achieve a higher beam gain between the network device and the terminal device, thereby improving cell coverage performance.

FIG. 4 is a schematic flowchart of a beam weight obtaining method 300 according to an embodiment. As shown in FIG. 4, the method 300 includes the following steps.

S310: A network device obtains a plurality of paths that meet a multipath aggregation condition, where the multipath aggregation condition includes one or more of the following conditions: a condition that every two paths in the plurality of paths need to meet in space, and a condition that every two paths in the plurality of paths need to meet in power.

It should be understood that the multipath aggregation condition may include the condition that every two paths in the plurality of paths need to meet in space, or may include the condition that every two paths in the plurality of paths need to meet in power, or may include both of the foregoing two conditions.

Herein, if the multipath aggregation condition includes the condition that every two paths in the plurality of paths need to meet in space and the condition that every two paths in the plurality of paths need to meet in power, the network device may identify, based on a multipath aggregation condition, a plurality of paths having relatively good spatial isolation and a relatively small energy difference.

In an optional condition, the condition that every two paths in the plurality of paths need to meet in space includes: a spatial angle between every two paths in the plurality of paths is greater than or equal to an angle threshold. In other words, herein, the angle threshold may be introduced to select a plurality of paths that meet a condition in terms of a spatial distance.

The angle threshold may be determined by the network device based on a beam width and another system parameter (for example, a total quantity of beams or a cell coverage unit).

For example, that a spatial angle between every two paths in the plurality of paths is greater than or equal to an angle threshold is determined according to the following formula:

$$\sqrt{(\phi_x-\phi_y)^2+(\theta_x-\theta_y)^2} \geq \eta_{th} \quad \text{(formula 1), where}$$

$\eta_{th}$ represents the angle threshold, $\phi_x$ represents a horizontal angle of an $x^{th}$ path, $\theta_x$ represents a vertical angle of the $x^{th}$ path, $\phi_y$ represents a horizontal angle of a $y^{th}$ path, and $\theta_y$ represents a vertical angle of the $y^{th}$ path, and the $x^{th}$ path and the $y^{th}$ path are any two paths in the plurality of paths.

The network device may select, according to the foregoing formula 1 about the angle threshold, paths that can meet the angle threshold, to obtain paths having relatively high spatial isolation. For paths that are close to each other in space, namely, paths that do not meet the angle threshold, the network device may consider the paths as a same path cluster, and do not perform multipath aggregation. For example, if $\eta_{th}=20°$, and two paths obtained by the network device are an AOD 1 (expressed as $[\phi_1, \theta_1]$) and an AOD 2 (expressed as $[\phi_2, \theta_2]$), angles of the two paths are substituted into the foregoing formula (1), to obtain $\sqrt{(\phi_1-\phi_2)^2+(\theta_1-\theta_2)^2}<20°$ through calculation. In this case, the AOD 1 and the AOD 2 are considered as a same path cluster, and multipath aggregation is not performed.

In conclusion, the network device may identify, based on the angle threshold, a plurality of paths that can be aggregated and that have relatively good spatial isolation.

In another optional condition, the condition that every two paths in the plurality of paths need to meet in power includes: a power difference between every two paths in the plurality of paths is less than a power threshold. In other words, herein, the power threshold may be introduced to select a plurality of paths that meet a condition in terms of power.

The power threshold may be determined by the network device. Optionally, the network device may set the power threshold based on a priori value.

For example, that a power difference between every two paths in the plurality of paths is less than a power threshold is determined according to the following formula:

$$|\alpha_x|-|\alpha_y|<\zeta_{th} \quad \text{(formula 2), where}$$

$\zeta_{th}$ represents the power threshold, $|\alpha_x|$ represents an absolute value of energy of the $x^{th}$ path, and $|\alpha_y|$ represents an absolute value of energy of the $y^{th}$ path.

The network device may select, according to the foregoing formula 2 about the power threshold, paths that can meet the power threshold, to obtain paths having relatively close powers or energy. However, for paths having a relatively large power difference, the network device does not need to perform aggregation. For example, if $\zeta_{th}=5$ dB, and two paths obtained by the network device are an AOD 1 (whose energy is $|\alpha_1|$) and an AOD 2 (whose energy is $|\alpha_2|$), energy of the two paths is substituted into the power threshold determining formula, to obtain $|\alpha_1|-|\alpha_2|\geq 5$ dB through calculation. In this case, it is considered that an energy difference between the AOD 1 and the AOD 2 is excessively large, and multipath aggregation is not performed.

It should be understood that the network device may alternatively select another condition as the multipath aggregation condition. The foregoing two conditions are merely examples for description, and do not constitute a limitation on this embodiment.

S320: The network device determines aggregation information based on each path in the plurality of paths, where the aggregation information includes information required by the network device to generate an aggregation path corresponding to the plurality of paths.

For example, the network device obtains, by scanning a plurality of beams in a beam codebook, a plurality of optimal beams fed back by a terminal device. Then, the network device selects, from the plurality of optimal beams based on the multipath aggregation condition, the plurality of paths that meet the multipath aggregation condition. The network device obtains the plurality of paths, and then determines the aggregation information based on the plurality of paths, where the aggregation information includes the information required to generate the aggregation path. The "aggregation path" may be understood as a path obtained by the network device by aggregating the plurality of paths. The network device uses the aggregation information, and may calculate a beam weight of the aggregation path by using the aggregation information, to generate a corresponding beam.

Optionally, the aggregation information may include one or more of the following information: a beam weight corresponding to the path, a power allocation coefficient corresponding to the path, and phase difference information corresponding to the path.

In this embodiment, phase compensation needs to be performed on the path. Before performing phase compensation on the path, the network device needs to learn of the phase difference information. The following provides two manners for obtaining the phase difference information.

Manner 1:

Optionally, the method 300 further includes: the network device sends a downlink reference signal to the terminal device, where the downlink reference signal is used by the terminal device to measure the plurality of paths; receives measurement information from the terminal device, where the measurement information includes phase information of each path in the plurality of paths; determines the phase difference information based on the phase information of the path; and performs, based on the phase difference information, phase compensation on a path corresponding to the phase difference information.

For example, the network device sends the downlink reference signal (which may be one or more downlink reference signals) to the terminal device through the plurality of paths, so that the terminal device measures the plurality of paths. After obtaining the measurement information of each path through measurement, the terminal device reports the measurement information to the network device. The network device may determine the phase difference information based on the measurement information, and then perform phase compensation on the corresponding path by using the phase difference information. For example, the network device obtains a phase difference between paths in two different directions (for example, a first path and a path in a direction reverse to the first path), and then compensates the phase difference to the reverse path, so that the path in a direction reverse to the first path is in a same direction as the first path, to facilitate subsequent aggregation.

Herein, the measurement information reported by the terminal device may directly include the phase difference information, or may include a vector index (for example, the network device may determine the phase difference information based on the vector index).

Optionally, the measurement information includes the phase difference information determined by the terminal device.

Alternatively, the measurement information includes the vector index determined by the terminal device, where the vector index is used to indicate a vector corresponding to the plurality of paths. That the network device determines the phase difference information based on the measurement information includes: the network device searches for, based on the vector index, the vector corresponding to the plurality of paths, and determines the phase difference information based on the vector corresponding to the plurality of paths.

For example, the network device may send the downlink reference signal to the terminal device, so that the terminal device measures a precoding matrix PMI. Then, the terminal device may feed back the measurement information to the network device. The measurement information may be the phase difference information determined by the terminal device. In this way, the network device may directly obtain the phase difference information sent by the terminal device. Alternatively, the measurement information may be the vector index. In this way, the network device may search for a corresponding vector based on the vector index, and determine the phase difference information based on the vector.

Herein, the network device searches for the corresponding vector based on the vector index, and then calculates the phase difference by using elements in the vector. A length of the vector is a quantity of the plurality of paths, and a phase difference between values in the vector is a phase difference between the paths. Two-port measurement is used as an example. The network device sends the beam weights $f_{[\phi_1, \theta_1]}$ and $f_{[\phi_1, \theta_2]}$ to the terminal device in a time division manner by using a two-port CSI-RS. The terminal device measures the PMI, and feeds back the measurement information to the network device. A set of precoding matrix PMI codebooks may be $$\left\{ \left[\frac{1}{\sqrt{2}}, \frac{1}{\sqrt{2}}\right], \left[\frac{1}{\sqrt{2}}, \frac{-1}{\sqrt{2}}\right], \left[\frac{1}{\sqrt{2}}, \frac{j}{\sqrt{2}}\right], \left[\frac{1}{\sqrt{2}}, \frac{-j}{\sqrt{2}}\right] \right\},$$

and corresponding indexes are $\{0, 1, 2, 3\}$. The terminal device may feed back an optimal index of a PMI codebook to the network device, for example, the fed-back index is 2. The network device finds a codeword $$\left[\frac{1}{\sqrt{2}}, \frac{j}{\sqrt{2}}\right]$$

based on the index 2 (where $$\frac{1}{\sqrt{2}}$$

represents a phase 0° of the $1^{st}$ path and $$\frac{j}{\sqrt{2}}$$

represents a phase 90° of the $2^{nd}$ path), so that a phase difference $\Delta\psi_2 = 90°$ between the $2^{nd}$ path and the $1^{st}$ path may be deduced.

Therefore, in the manner 1, the network device may directly obtain the phase difference information fed back by the terminal device, or may determine the phase difference information based on the vector index reported by the terminal device. In other words, the phase difference information is determined in a relatively flexible manner.

Manner 2:

That the network device obtains the phase difference information in a sampling traversal manner includes:

The network device traverses phase differences in a preset phase difference sampling range for each path, and separately calculates beam weights of a plurality of aggregation paths.

The network device receives a beam quality measurement result from a terminal device, where the beam quality measurement result includes a result obtained after the terminal device measures beam quality corresponding to a beam weight of each aggregation path in the beam weights of the plurality of aggregation paths.

The network device selects, based on the measurement result, a beam weight of an aggregation path having best beam quality from the beam weights of the plurality of aggregation paths.

The network device uses, as the phase difference information, a plurality of sampling phase differences corresponding to the beam weight of the aggregation path having the best beam quality.

For example, the network device may traverse all phase differences in the preset sampling range, to generate corresponding multipath aggregation beam weights one by one. Correspondingly, the terminal device may measure beam quality corresponding to beams having the plurality of beam weights generated by the network device, for example, measure RSRPs, and then feed back a beam measurement result to the network device. The network device may select, based on the beam measurement result, the beam weight of the aggregation path having best beam quality from the plurality of beams corresponding to the beam weights of the plurality of aggregation paths. Finally, the network device uses, as a phase difference corresponding to each path, a plurality of sampling phase differences corresponding to the beam weight of the aggregation path having the best beam quality. The network device may obtain the phase difference of each path in the foregoing traversal manner.

For example, three paths are used as an example. A phase difference between the $2^{nd}$ path and the $1^{st}$ path is $$\Delta \psi_2 \in \left\{ i * \frac{2\pi}{N_{sample}} : 1 \leq i \leq N_{sample} \right\},$$

where i is an integer; and a phase difference between the $3^{rd}$ path and the $1^{st}$ path is $$\Delta \psi_3 \in \left\{ i * \frac{2\pi}{N_{sample}} : 1 \leq i \leq N_{sample} \right\}.$$

In this case, there are a total of $N_{sample}^2$ different phase aggregation manners for the three paths, that is, the network device generates corresponding multipath aggregation beam weights one by one according to a formula $$f_{[\phi_1,\theta_1],[\phi_2,\theta_2],[\phi_3,\theta_3]} =$$
$$Q(\beta_1 * f_{[\phi_1,\theta_1]} + \beta_2 * e^{j\Delta\psi_2} * f_{[\phi_2,\theta_2]} + \beta_3 * e^{j\Delta\psi_3} * f_{[\phi_3,\theta_3]})$$

by using $N_{sample}^2$ phase differences. Then, the terminal device measures RSRPs of beams having the plurality of generated beam weights, and feeds back an RSRP measurement result to the network device. The network device only needs to select a beam weight corresponding to a beam having a highest RSRP. A phase difference used for the beam weight corresponding to the beam having the highest RSRP is a phase difference finally determined by the network device.

Therefore, in the manner 2, the network device may determine the phase difference information in the sampling traversal manner.

It should be understood that the foregoing manner 1 and manner 2 describe only an example of a method for obtaining the phase difference information. Actually, the phase difference information may be obtained in another manner. This is not limited in this embodiment.

Optionally, the aggregation information further includes a beam weight corresponding to the path and a power allocation coefficient corresponding to the path. The method 300 further includes:

The network device obtains angle information, phase information, and energy information of each path in the plurality of paths. The network device determines, based on the angle information and the phase information of the path, the beam weight corresponding to the path. The network device determines, based on the energy information of the path, the power allocation coefficient corresponding to the path.

For example, after obtaining the plurality of paths, the network device may obtain the angle information, the phase information, and the energy information of the path. Then, the network device generates the beam weight corresponding to the path by using the angle information, the phase information, and the energy information of the path. The network device generates, based on the energy information of the path, the power allocation coefficient corresponding to the path.

For example, the aggregation information includes the beam weight corresponding to the path, the power allocation coefficient corresponding to the path, and the phase difference corresponding to the path. Optionally, the network device performs normalization calculation on the beam weight corresponding to the path, the power allocation coefficient corresponding to the path, and the phase difference information corresponding to the path, to generate the beam weight corresponding to the aggregation path.

Herein, a reason for performing power normalization is described with reference to an example. For example, it is assumed that the network device has four antennas, and the beam weight is a vector having four elements. For example, f=[1, −1, 1, −1]. Each element represents a power and a phase loaded onto each antenna. In a weight calculation process, f may be amplified, and energy of the elements may be different. For example, f=[1, −2, 3, −1]. Due to a constraint (a constant total transmit power) of a physical system, power normalization needs to be performed on the weight. For example, $$f = \frac{f'}{\|f'\|} = \frac{1}{\sqrt{15}}[1, -2, 3, -1].$$

It should be understood that a normalization manner is not limited in this embodiment, and another normalization function may be used. The foregoing normalization formula is merely an example for description but is not intended to limit this embodiment to the foregoing normalization formula.

Optionally, that the network device performs normalization calculation on the beam weight corresponding to the path, the power allocation coefficient corresponding to the path, and the phase difference corresponding to the path, to generate the beam weight corresponding to the aggregation path includes:

The network device calculates the beam weight corresponding to the aggregation path according to the following formula (3):

$$f_{L_0} = Q\left(\sum_{l=1}^{L_0} \beta_l * e^{j\Delta\psi_l} * q_l\right), \quad (3)$$

where $f_{L_0}$ represents the beam weight corresponding to the aggregation path, $Q(\cdot)$ represents a normalization function, $\beta_l$ represents a power allocation parameter of an $l^{th}$ path, $$\beta_l = \frac{|\alpha_l|}{\sum_{i=1}^{L_0} |\alpha_i|}, \quad 1 \le l \le L_0, \alpha_l$$

represents energy of the $l^{th}$ path, $q_l$ represents a beam weight of the $l^{th}$ path, and $\Delta\psi_l$ represents a phase difference between the $l^{th}$ path and the $1^{st}$ path.

For the foregoing normalization formula (3), in an example in which the network device determines two paths that meet the multipath aggregation condition, the beam weight, of the aggregation path, generated by the network device may be:

$$f_{[\phi_1,\theta_1],[\phi_2,\theta_2]} = Q(\beta_1 * f_{[\phi_1,\theta_1]} + \beta_2 * e^{j\Delta\psi} * f_{[\phi_2,\theta_2]}),$$

where the power allocation coefficient is $$\left(\beta_i = \frac{|\alpha_i|}{|\alpha_1| + |\alpha_2|}, \quad i = 1, 2\right),$$

and the phase difference information is $(\Delta\psi)$.

It should be understood that, only two paths that meet the multipath aggregation condition are used as an example for description herein, but this does not constitute a limitation on this embodiment. Actually, there may be a plurality of paths that meet the multipath aggregation condition, and the foregoing formula (3) is still applicable.

To help a person of ordinary skill in the art understand the embodiments, the following provides description with reference to a specific simulation example.

An example in which the network device is a BS and the terminal device is UE is used for description. A specific simulation parameter may be set as follows:

1. Antenna configuration: It is considered that, a uniform linear array (ULA) is configured on a BS side, where $N_{BS}=64$; and a single antenna is configured on a UE side (or for the BS side, an antenna array on the UE side is equivalent to the single antenna), where $N_{UE}=1$. Because the ULA is considered, a spatial angle includes only a horizontal angle $\phi$ (a vertical angle $\theta$ is omitted herein).

2. Channel generation:

$$H = \sqrt{\frac{N_{UE}N_{BS}}{L}} * \sum_{l=1}^{L} \alpha_l * p_l * q_l^H,$$

where $\alpha_l \square CN(0,1)$ represents a complex gain of the $l^{th}$ path (without loss of generality, $|\alpha_1| \ge |\alpha_2| \ge \ldots \ge |\alpha_L|$), $$p_l = \frac{1}{\sqrt{N_{UE}}} * \left[1, e^{j*\frac{2\pi}{\lambda}*d_{UE}*\cos(\phi_{UE,l})}, \ldots, e^{j*(N_{UE}-1)*\frac{2\pi}{\lambda}*d_{UE}*\cos(\phi_{UE,l})}\right]^T$$

represents a steering vector of a path corresponding to an AOA ($\phi_{UE,l} \square u[0,2\pi]$) on the UE side on the array on the UE side, $$q_l = \frac{1}{\sqrt{N_{BS}}} * \left[1, e^{j*\frac{2\pi}{\lambda}*d_{BS}*\cos(\phi_{BS,l})}, \ldots, e^{j*(N_{BS}-1)*\frac{2\pi}{\lambda}*d_{BS}*\cos(\phi_{BS,l})}\right]^T$$

represents a steering vector of a path corresponding to an AOD ($\phi_{BS,l} \square u[0, 2\pi]$) on the BS side on the array on the BS side, $$\sqrt{\frac{N_{UE}N_{BS}}{L}}$$

represents a power normalization factor, L represents a total quantity of paths, $\lambda$ represents a wavelength of an mmWave, $d_{UE}$ represents an antenna element spacing on the UE side, and $d_{BS}$ represents an antenna element spacing on the BS side.

3. Downlink signal transmission model: The single-user single-stream scenario is considered, and $y=\sqrt{\rho_{Ant}}*H*f*s+n$, where $y \in \square^{N_{UE}\times 1}$ represents a received signal, $H \in \square^{N_{UE}\times N_{BS}}$ represents a downlink channel matrix, $f \in \square^{N_{BS}\times 1}$ represents an analog weight on the BS side, $s \in \square^{1\times 1}$ represents a sent constellation point symbol and meets $E[s]=0$ and $E[|s|^2]=1$, $n \in \square^{N_{UE}\times 1}$ represents complex Gaussian white noise and meets $n \square CN(0, I)$, and $\rho_{Ant}$ represents an SNR before signal combination.

4. Demodulation signal on the UE side: $\hat{s}=g^H*y=\sqrt{\rho_{Ant}}*g^H*H*f*s+g^H*n$, where $\hat{s}$ represents a signal estimated result on the UE side, and $g \in \square^{N_{UE}\times 1}$ represents an analog weight on the UE side.

5. SNR on the UE side after signal combination:

$$SNR_{Beam} = \rho_{Ant} * \frac{|g^H H f|^2 * E[|s|^2]}{E[|g^H n|^2]} = \rho_{Ant} * \frac{|g^H H f|^2}{g^H g}.$$

6. Power constraint on an analog weight: Power normalization is performed on the analog weight on the BS side and the analog weight on the UE side, that is, $\|f\|_2=1$ and $\|g\|_2=1$.

For ease of comparison, simulation is separately performed on the following three methods: (1) a current technology 1: a solution in which an optimal solution is obtained through singular value decomposition; (2) a current technology 2: a solution for aligning with the strongest path in FIG. 3; and (3) a solution in which two-path aggregation path obtained in the manner in this embodiment.

A singular value decomposition (Singular-value decomposition, SVD) optimal solution solution in the current technology 1 is simulated, that is, $H=U*\Lambda*V^H=\Sigma_{i=1}^{N_{UE}}\lambda_i*u_i*v_i^H$, where $U=[u_1, \ldots, u_{N_{UE}}] \in \square^{N_{UE}\times N_{UE}}$ represents a left singular vector, $V=[v_1, \ldots, v_{N_{BS}}] \in \square^{N_{BS}\times N_{BS}}$ represents a right singular vector. In this way, an optimal analog weight on the BS side is $f_{SVD}=v_1$, and an optimal analog weight on the UE side is $$g_{SVD} = u_1 = \frac{Hv_1}{\|Hv_1\|_2}.$$

For the strongest path obtained in the current technology 2, an analog weight on the BS side is $f_{dir1}=q_1$ and an analog weight on the UE side is $$g_{dir1} = \frac{H * f_{dir1}}{\|H * f_{dir1}\|_2}.$$

In the embodiments, the analog weight obtained on the BS side in the weight obtaining manner in this embodiment is $f_{dir2}=Q(\beta_1*q_1+\beta_2*e^{j\Delta\psi}*q_2)$; a corresponding analog weight on the UE side is $$g_{dir2} = \frac{H^* f_{dir2}}{\|H^* f_{dir2}\|_2},$$

where $$\beta_i = \frac{|\alpha_i|}{|\alpha_1|+|\alpha_2|}, i = 1, 2,$$

and $\Delta\psi$ is obtained through measurement.

Figure 5:
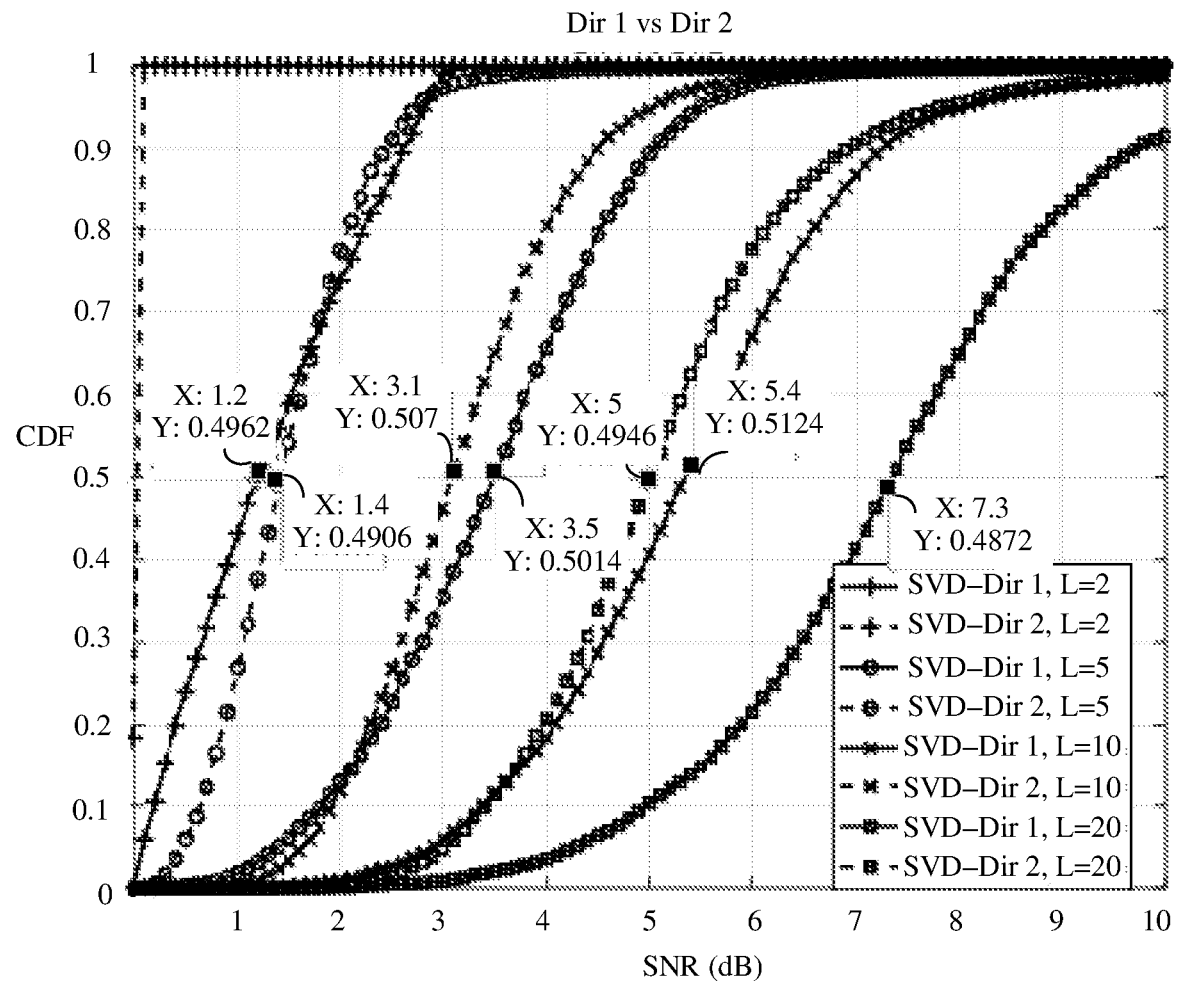
FIG. 5 is a schematic diagram of a simulation result.

For the foregoing three methods, specific simulation parameters are: (1) $N_{BS}$=64 and $N_{UE}$=1; (2) $\rho_{Ant}$=1; (3) L∈{2, 5, 10, 20}; (4) $d_{BS}$=$d_{UE}$=½λ; and (5) a quantity 5000 of times a channel is randomly generated. SNRs, on the UE side, of the SVD optimal solution solution (SVD, namely, the solution in the current technology 1), the solution (Dir 1, namely, the solution in the current technology 2) for aligning with the strongest path, and the two-path aggregation solution (Dir 2, namely, the solution in the embodiments) are calculated, a performance difference (corresponding to a simulation result SVD-Dir 1 in the figure) between the solution (Dir 1) for aligning with the strongest path and the SVD optimal solution solution (SVD) and a performance difference (SVD-Dir 2) between the two-path aggregation solution (Dir 2) and the SVD optimal solution solution (SVD) are calculated, and then a cumulative distribution function (CDF) curve is plotted. For a meaning of a CDF, refer to existing descriptions. FIG. 5 shows a detailed simulation result. As shown in FIG. 5, a horizontal coordinate indicates an SNR performance difference (in a unit of dB), and a vertical coordinate indicates a CDF value.

It is considered that total quantity L of paths=2. When CDF=50%, it can be understood from FIG. 5 that, the performance difference between the Dir 1 and the SVD is 1.2 dB, and the Dir 2 solution is basically the same as the SVD solution (that is, performance of the Dir 2 is close to performance bound of the SVD).

It is considered that L=5. When CDF=50%, it can be understood from FIG. 5 that, the performance difference between the Dir 1 and the SVD is 3.5 dB, and the performance difference between the Dir 2 solution and the SVD is 1.4 dB. Therefore, compared with the solution in the current technology 2, in the solution, performance of the SNR on the UE side is improved by 2.1 dB.

It is considered that L=10. When CDF=50%, it can be understood from FIG. 5 that, the performance difference between the Dir 1 and the SVD is 5.4 dB, and the performance difference between the Dir 2 solution and the SVD is 3.1 dB. Therefore, compared with the solution in the current technology 2, in the solution, performance of the SNR on the UE side is improved by 2.3 dB.

It is considered that L=20. When CDF=50%, it can be understood from FIG. 5 that, the performance difference between the Dir 1 and the SVD is 7.3 dB, and the performance difference between the Dir 2 solution and the SVD is 5.0 dB. Therefore, compared with the solution in the current technology 2, in the solution, performance is improved by 2.3 dB.

It can be understood from the foregoing simulation data that, compared with the solution in the current technology, the beam is obtained by using the solution in this embodiment, and the SNR of the terminal device is significantly improved.

It should be understood that the foregoing simulation example is merely an example for description and does not constitute a limitation on the protection scope of the embodiments. Actually, a person of ordinary skill in the art may transform a parameter in the foregoing simulation example to obtain another simulation result.

It should be understood that the embodiments may be independently implemented, or may be properly combined, and the explanation or description of the terms in the embodiments may be cited or explained in the embodiments. This is not limited in the embodiments.

It should be further understood that sequence numbers of the foregoing processes do not mean execution sequences in the embodiments. The execution sequences of the processes should be determined based on functions and internal logic of the processes, and should not be construed as any limitation on the implementation processes of the embodiments.

The beam weight obtaining method according to the embodiments is described in detail above with reference to FIG. 1 to FIG. 5. A beam weight obtaining apparatus according to the embodiments is to be described below with reference to FIG. 6 to FIG. 9. It should be understood that the features described in the method embodiments are also applicable to the following apparatus embodiments.

Figure 6:
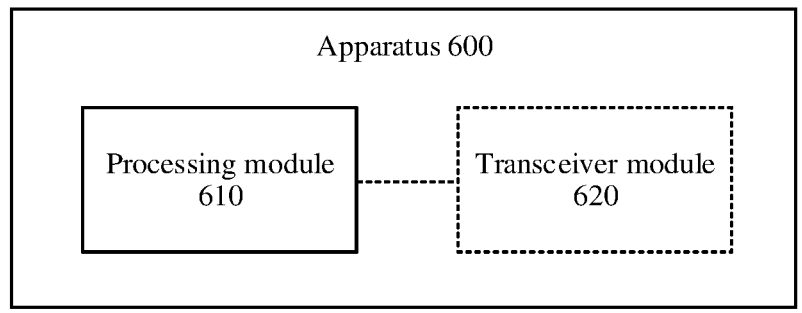
FIG. 6 is a schematic block diagram of a beam weight obtaining apparatus according to an embodiment.

FIG. 6 is a schematic block diagram of a beam weight obtaining apparatus 600 according to an embodiment. The apparatus 600 is configured to perform the method performed by the network device in the foregoing method embodiments. Optionally, a specific form of the apparatus 600 may be a network device or a chip in the network device. This is not limited in this embodiment. The apparatus 600 includes:

a processing module 610, configured to obtain a plurality of paths that meet a multipath aggregation condition, where the multipath aggregation condition includes one or more of the following conditions: a condition that every two paths in the plurality of paths need to meet in space, and a condition that every two paths in the plurality of paths need to meet in power, where the processing module 610 is further configured to determine aggregation information based on the plurality of paths, where the aggregation information includes information required by the network device to generate an aggregation path corresponding to the plurality of paths.

In a possible implementation, the aggregation information includes phase difference information. The apparatus 600 further includes: a transceiver module 620, configured to: send a downlink reference signal to a terminal device, where the downlink reference signal is used by the terminal device to measure the plurality of paths; and receive measurement information from the terminal device. Correspondingly, the processing module 610 is further configured to: determine the phase difference information based on the measurement information; and perform, based on the phase difference information, phase compensation on a path corresponding to the phase difference information.

Optionally, the measurement information includes the phase difference information determined by the terminal device. Alternatively, the measurement information includes a vector index determined by the terminal device, where the vector index is used to indicate a vector corresponding to the plurality of paths. That the processing module 610 is configured to determine the phase difference information based on the measurement information includes: searching for, based on the vector index, the vector corresponding to the plurality of paths, and determining the phase difference information based on the vector corresponding to the plurality of paths.

In a possible implementation, the aggregation information includes phase difference information. The processing module 610 is further configured to obtain the phase difference information in a sampling traversal manner.

Optionally, that the processing module 610 is further configured to obtain the phase difference information in a sampling traversal manner includes: traversing phase differences in a preset phase difference sampling range for each path, and separately calculating beam weights of a plurality of aggregation paths; invoking the transceiver module 620 to receive a beam quality measurement result from a terminal device, where the beam quality measurement result includes a result obtained after the terminal device measures beam quality corresponding to a beam weight of each aggregation path in the beam weights of the plurality of aggregation paths; selecting, based on the beam quality measurement result, a beam weight of an aggregation path having best beam quality from the beam weights of the plurality of aggregation paths; and using, as the phase difference information, a plurality of sampling phase differences corresponding to the beam weight of the aggregation path having the best beam quality.

In a possible implementation, the aggregation information further includes a beam weight corresponding to the path and a power allocation coefficient corresponding to the path. The processing module 610 is further configured to: obtain angle information, phase information, and energy information of each path in the plurality of paths; determine, based on the angle information and the phase information of the path, the beam weight corresponding to the path; and determine, based on the energy information of the path, the power allocation coefficient corresponding to the path.

Optionally, the processing module 610 is further configured to perform normalization calculation on the beam weight corresponding to the path, the power allocation coefficient corresponding to the path, and the phase difference information, to generate the beam weight corresponding to the aggregation path.

Optionally, that the processing module 610 is further configured to perform normalization calculation on the beam weight corresponding to the path, the power allocation coefficient corresponding to the path, and a phase difference corresponding to the path, to generate the beam weight corresponding to the aggregation path includes:
calculating the beam weight corresponding to the aggregation path according to the following formula:

$$f_{L_0} = Q\left(\sum_{l=1}^{L_0} \beta_l * e^{j\Box \psi_l} * q_l\right),$$

where $f_{L_0}$ represents the beam weight corresponding to the aggregation path, $Q(\bullet)$ represents a normalization function, $\beta_l$ represents a power allocation parameter of an $l^{th}$ path, $$\beta_l = \frac{|\alpha_l|}{\sum_{i=1}^{L_0} |\alpha_i|}, 1 \le l \le L_0,$$

$\alpha_l$ represents energy of the $l^{th}$ path, $q_l$ represents a beam weight of the $l^{th}$ path, and $\Box \psi_l$ represents a phase difference between the $l^{th}$ path and an $1^{th}$ path.

Optionally, the condition that every two paths in the plurality of paths need to meet in space includes: a spatial angle between every two paths in the plurality of paths is greater than or equal to an angle threshold.

Optionally, the condition that every two paths in the plurality of paths need to meet in power includes: a power difference between every two paths in the plurality of paths is less than a power threshold.

Optionally, that a spatial angle between every two paths in the plurality of paths is greater than or equal to an angle threshold is determined according to the following formula:

$$\sqrt{(\phi_x - \phi_y)^2 + (\theta_x - \theta_y)^2} \ge \eta_{th}, \text{ where}$$

$\eta_{th}$ represents a distance threshold, $\phi_x$ represents a horizontal angle of an $x^{th}$ path, $\theta_x$ represents a vertical angle of the $x^{th}$ path, $\phi_y$ represents a horizontal angle of a $y^{th}$ path, and $\theta_y$ represents a vertical angle of the $y^{th}$ path, and the $x^{th}$ path and the $y^{th}$ path are any two paths in the plurality of paths.

Optionally, that a power difference between every two paths in the plurality of paths is less than a power threshold is determined according to the following formula:

$$|\alpha_x| - |\alpha_y| < \zeta_{th}, \text{ where}$$

$\zeta_{th}$ represents the power threshold, $|\alpha_x|$ represents an absolute value of energy of the $x^{th}$ path, and $|\alpha_y|$ represents an absolute value of energy of the $y^{th}$ path.

It should be understood that the beam weight obtaining apparatus 600 according to this embodiment may correspond to the method performed by the network device in the foregoing method embodiments, for example, the method in FIG. 4. In addition, the foregoing and other management operations and/or functions of the modules in the apparatus 600 are separately used to implement corresponding steps of the method performed by the network device in the foregoing method embodiments. Therefore, the beneficial effects in the foregoing method embodiments can also be achieved. For brevity, details are not described herein.

It should further be understood that the modules in the apparatus 600 may be implemented in a form of software and/or hardware. This is not limited. In other words, the apparatus 600 is presented in a form of function modules. The "module" herein may be an application-specific integrated circuit (ASIC), a circuit, a processor and a memory that execute one or more software or firmware programs, an integrated logic circuit, and/or another component that can provide the foregoing functions. Optionally, in another embodiment, a person of ordinary skill in the art may figure out that the apparatus 600 may be in a form shown in FIG.

7. The processing module 610 may be implemented by using a processor 701 shown in FIG. 7. The transceiver module 620 may be implemented by using a transceiver 703 shown in FIG. 7. For example, the processor is implemented by executing a computer program stored in the memory. Optionally, when the apparatus 600 is a chip, a function and/or an implementation process of the transceiver module 610 may alternatively be implemented by using a pin, a circuit, or the like. Optionally, the memory is a storage unit in the chip, for example, a register or a cache. The storage unit may alternatively be a storage unit, such as a memory 702 shown in FIG. 7, that is in the computer device and that is located outside the chip.

Figure 7:
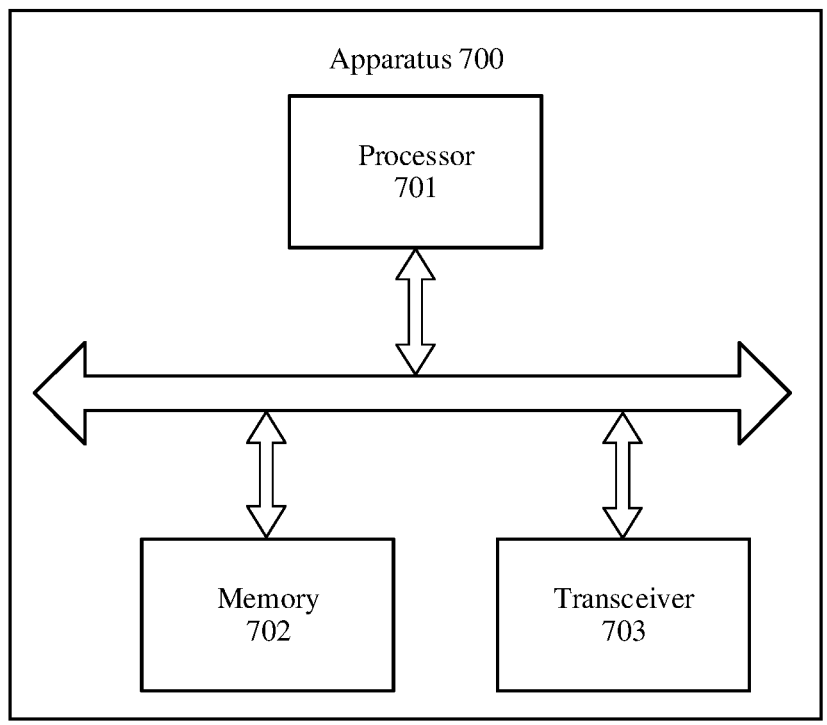
FIG. 7 is a schematic structural diagram of a beam weight obtaining apparatus according to an embodiment.

FIG. 7 is a schematic structural diagram of a beam weight obtaining apparatus 700 according to an embodiment. As shown in FIG. 7, the apparatus 700 includes a processor 701.

In a possible implementation, the processor 701 is configured to: obtain a plurality of paths that meet a multipath aggregation condition, where the multipath aggregation condition includes one or more of the following conditions: a condition that every two paths in the plurality of paths need to meet in space, and a condition that every two paths in the plurality of paths need to meet in power; and determine aggregation information based on the plurality of paths, where the aggregation information includes information required by a network device to generate an aggregation path corresponding to the plurality of paths.

Optionally, the processor 701 may invoke an interface to perform the following receiving and sending actions: sending a downlink reference signal to a terminal device, where the downlink reference signal is used by the terminal device to measure the plurality of paths; and receiving measurement information from the terminal device. The processor 701 is further configured to: determine the phase difference information based on the measurement information; and perform, based on the phase difference information, phase compensation on a path corresponding to the phase difference information.

It should be understood that the processor 701 may invoke the interface to perform the foregoing receiving and sending actions. The invoked interface may be a logical interface or a physical interface. This is not limited. Optionally, the physical interface may be implemented by a transceiver. Optionally, the apparatus 700 further includes a transceiver 703.

Optionally, the apparatus 700 further includes a memory 702, and the memory 702 may store program code in the foregoing method embodiments, so that the processor 701 invokes the program code.

For example, if the apparatus 700 includes the processor 701, the memory 702, and the transceiver 703, the processor 701, the memory 702, and the transceiver 703 communicate with each other through an inner connection path, to transmit a control signal and/or a data signal. In a possible implementation, the processor 701, the memory 702, and the transceiver 703 may be implemented by using a chip. The processor 701, the memory 702, and the transceiver 703 may be implemented in a same chip, or may be separately implemented in different chips, or functions of any two of the processor 701, the memory 702, and the transceiver 703 are implemented in one chip. The memory 702 may store the program code, and the processor 701 invokes the program code stored in the memory 702, to implement a corresponding function of the apparatus 700.

It should be understood that the apparatus 700 may be further configured to perform other steps and/or operations on a network device side in the foregoing embodiments. For brevity, details are not described herein.

Figure 8:
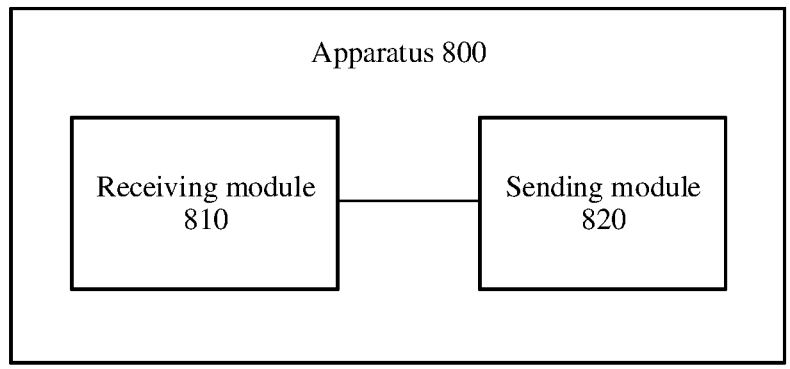
FIG. 8 is a schematic block diagram of a beam weight obtaining apparatus according to another embodiment.

FIG. 8 is a schematic block diagram of a beam weight obtaining apparatus 800 according to an embodiment. The apparatus 800 is configured to perform the method performed by the terminal device in the foregoing method embodiments. Optionally, a specific form of the apparatus 800 may be a terminal device or a chip in the terminal device. This is not limited in this embodiment. The apparatus 800 includes:

a receiving module 810, configured to receive a downlink reference signal from a network device, where the downlink reference signal is used by the terminal device to measure a plurality of paths; and a sending module 820, configured to send measurement information to the network device, where the measurement information is used by the network device to determine phase difference information.

Optionally, the measurement information includes the phase difference information determined by the terminal device.

Optionally, the measurement information includes a vector index determined by the terminal device, where the vector index is used to indicate a vector corresponding to the plurality of paths.

It should be understood that the beam weight obtaining apparatus 800 according to this embodiment may correspond to the method performed by the terminal device in the foregoing method embodiments. In addition, the foregoing and other management operations and/or functions of the modules in the apparatus 800 are separately used to implement corresponding steps of the method performed by the terminal device in the foregoing method embodiments. Therefore, the beneficial effects in the foregoing method embodiments can also be achieved. For brevity, details are not described herein.

It should further be understood that the modules in the apparatus 800 may be implemented in a form of software and/or hardware. This is not limited. In other words, the apparatus 800 is presented in a form of function modules. The "module" herein may be an ASIC, a circuit, a processor and a memory that execute one or more software or firmware programs, an integrated logic circuit, and/or another component that can provide the foregoing functions. Optionally, in another embodiment, a person of ordinary skill in the art may figure out that the apparatus 800 may be in a form shown in FIG. 9. The processing module 810 may be implemented by using a processor 901 shown in FIG. 9. The transceiver module 820 may be implemented by using a transceiver 903 shown in FIG. 9. For example, the processor is implemented by executing a computer program stored in the memory. Optionally, when the apparatus 800 is a chip, a function and/or an implementation process of the transceiver module 810 may alternatively be implemented by using a pin, a circuit, or the like. Optionally, the memory is a storage unit in the chip, for example, a register or a cache. The storage unit may alternatively be a storage unit, such as a memory 902 shown in FIG. 9, that is in the computer device and that is located outside the chip.

Figure 9:
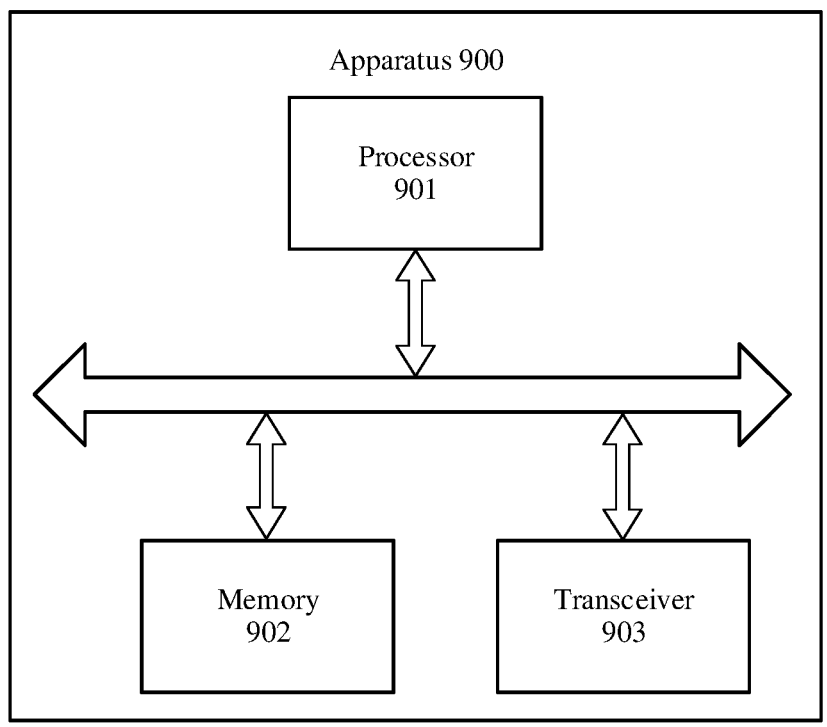
FIG. 9 is a schematic structural diagram of a beam weight obtaining apparatus according to another embodiment.

FIG. 9 is a schematic structural diagram of a beam weight obtaining apparatus 900 according to an embodiment. As shown in FIG. 9, the apparatus 900 includes a processor 901.

In a possible implementation, the processor 901 is configured to invoke an interface to perform the following receiving and sending actions: receiving a downlink reference signal from a network device, where the downlink reference signal is used by a terminal device to measure a plurality of paths; and sending measurement information to the network device, where the measurement information is used by the network device to determine phase difference information.

It should be understood that the processor 901 may invoke the interface to perform the foregoing receiving and sending actions. The invoked interface may be a logical interface or a physical interface. This is not limited. Optionally, the physical interface may be implemented by a transceiver. Optionally, the apparatus 900 further includes a transceiver 903.

Optionally, the apparatus 900 further includes a memory 902, and the memory 902 may store program code in the foregoing method embodiments, so that the processor 901 invokes the program code.

For example, if the apparatus 900 includes the processor 901, the memory 902, and the transceiver 903, the processor 901, the memory 902, and the transceiver 903 communicate with each other through an inner connection path, to transmit a control signal and/or a data signal. In a possible implementation, the processor 901, the memory 902, and the transceiver 903 may be implemented by using a chip. The processor 901, the memory 902, and the transceiver 903 may be implemented in a same chip, or may be separately implemented in different chips, or functions of any two of the processor 901, the memory 902, and the transceiver 903 are implemented in one chip. The memory 902 may store the program code, and the processor 901 invokes the program code stored in the memory 902, to implement a corresponding function of the apparatus 900.

It should be understood that the apparatus 900 may be further configured to perform other steps and/or operations on the terminal device side in the foregoing embodiments. For brevity, details are not described herein.

The method disclosed in the embodiments may be applied to a processor or may be implemented by a processor. The processor may be an integrated circuit chip and has a signal processing capability. In an implementation process, the steps in the foregoing method embodiments may be completed by using a hardware integrated logic circuit in the processor or an instruction in a form of software. The processor may be a general-purpose processor, a digital signal processor (DSP), an ASIC, a field programmable gate array (FPGA) or another programmable logic device, a discrete gate, a transistor logic device, a discrete hardware component, a system on chip (SoC), a central processing unit (CPU), a network processor (NP), a digital signal processing circuit (DSP), a micro controller unit (MCU), a programmable controller (PLD), or another integrated chip. The processor may implement or perform the methods, the steps, and logical block diagrams that are disclosed in the embodiments. The general-purpose processor may be a microprocessor, or the processor may be any conventional processor or the like. The steps in the methods disclosed with reference to the embodiments may be directly performed and completed through a hardware decoding processor or may be performed and completed through a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor.

It may be understood that, in the embodiments, the memory may be a volatile memory or a non-volatile memory or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative descriptions, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in the embodiments includes, but is not limited to, these memories and any memory of another proper type.

It should be understood that the term "and/or" describes only an association relationship between associated objects and represents that three relationships may exist. For example, A and/or B may represent the following three cases: only A exists, both A and B exist, and only B exists. In addition, the character "/" usually indicates an "or" relationship between the associated objects.

A person of ordinary skill in the art may be aware that units and algorithm steps in the examples described with reference to the embodiments may be implemented by electronic hardware or a combination of computer software and electronic hardware. Whether the functions are performed by hardware or software depends on particular applications and design constraint conditions of the solutions. A person of ordinary skill in the art may use different methods to implement the described functions for each particular application, but it should not be considered that the implementation goes beyond the scope.

It may be clearly understood by a person of ordinary skill in the art that, for the purpose of convenient and brief description, for detailed working processes of the foregoing system, apparatus, and unit, refer to corresponding processes in the foregoing method embodiments. Details are not described herein again.

In the several embodiments provided, it should be understood that the system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, for example, may be located in one position, or may be distributed on a plurality of network units. Some or all of the units may be selected based on an actual requirement to achieve the objectives of the solutions of the embodiments.

In addition, functional units in the embodiments may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the solutions essentially, or the part contributing to the current technology, or some of the solutions may be implemented in a form of a software product. The computer software product is stored in a storage medium and includes several instructions for instructing a computer device (which may be a personal computer, a server, or a network device) to perform all or some of the steps in the methods described in the embodiments. The foregoing storage medium includes: any medium that can store program code, such as a USB flash drive, a removable hard disk, a read-only memory ROM, a random access memory RAM, a magnetic disk, or an optical disc.

The foregoing descriptions are merely implementations of the embodiments, and are non-limiting. Any variation or replacement readily figured out by a person of ordinary skill in the art within the scope provided shall fall within the scope of the embodiments.

What is claimed is:

1. A beam weight obtaining method, comprising:
   obtaining, by a network device, a plurality of paths that meet a multipath aggregation condition, wherein a spatial angle between every two paths in the plurality of paths is greater than or equal to an angle threshold; and
   determining, by the network device, aggregation information based on the plurality of paths, wherein the aggregation information comprises information required by the network device to generate an aggregation path corresponding to the plurality of paths.

2. The method according to claim 1, wherein the aggregation information comprises phase difference information, and the method further comprises:
   sending, by the network device, a downlink reference signal to a terminal device, wherein the downlink reference signal is used by the terminal device to measure the plurality of paths;
   receiving, by the network device, measurement information from the terminal device;
   determining, by the network device, the phase difference information based on the measurement information; and
   performing, by the network device based on the phase difference information, phase compensation on a path corresponding to the phase difference information.

3. The method according to claim 2, wherein the measurement information comprises the phase difference information determined by the terminal device; or
   the measurement information comprises a vector index determined by the terminal device, wherein the vector index is used to indicate a vector corresponding to the plurality of paths, wherein the determining, by the network device, the phase difference information based on the measurement information comprises:
   searching for, by the network device based on the plurality of paths, the vector corresponding to the plurality of paths, and determining the phase difference information based on the vector corresponding to the plurality of paths.

4. The method according to claim 1, wherein the aggregation information comprises phase difference information, and the method further comprises:
   obtaining, by the network device, the phase difference information in a sampling traversal manner.

5. The method according to claim 4, wherein the obtaining, by the network device, of the phase difference information in a sampling traversal manner comprises:
   traversing, by the network device, phase differences in a preset phase difference sampling range for each path, and separately calculating beam weights of a plurality of aggregation paths;
   receiving, by the network device, a beam quality measurement result from a terminal device, wherein the beam quality measurement result comprises a result obtained after the terminal device measures beam quality corresponding to a beam weight of each aggregation path in the beam weights of the plurality of aggregation paths;
   selecting, by the network device based on the beam quality measurement result, a beam weight of an aggregation path having best beam quality from the beam weights of the plurality of aggregation paths; and
   using, by the network device as the phase difference information, a plurality of sampling phase differences corresponding to the beam weight of the aggregation path having the best beam quality.

6. The method according to claim 1, wherein the aggregation information further comprises a beam weight corresponding to the path and a power allocation coefficient corresponding to the path, and the method further comprises:
   obtaining, by the network device, angle information, phase information, and energy information of each path in the plurality of paths;
   determining, by the network device based on the angle information and the phase information of the path, the beam weight corresponding to the path; and
   determining, by the network device based on the energy information of the path, the power allocation coefficient corresponding to the path.

7. The method according to claim 6, further comprising:
   performing, by the network device, normalization calculation on the beam weight corresponding to the path, the power allocation coefficient corresponding to the path, and the phase difference information, to generate the beam weight corresponding to the aggregation path.

8. The method according to claim 7, wherein the performing, by the network device, of normalization calculation on the beam weight corresponding to the path, the power allocation coefficient corresponding to the path, and a phase difference corresponding to the path, to generate the beam weight corresponding to the aggregation path comprises:
   calculating, by the network device, the beam weight corresponding to the aggregation path according to the following formula:

$$f_{L_0} = Q\left(\sum_{l=1}^{L_0} \beta_l * e^{j\Box\psi_l} * q_l\right),$$

wherein
$f_{L_0}$ represents the beam weight corresponding to the aggregation path, $Q(\cdot)$ represents a normalization function, $\beta_l$ represents a power allocation parameter of an $l^{th}$ path, $$\beta_l = \frac{|\alpha_l|}{\sum_{i=1}^{L_0} |\alpha_i|}, 1 \le l \le L_0,$$

$\alpha_l$ represents energy of the $l^{th}$ path, $q_l$ represents a beam weight of the $l^{th}$ path, and $\Box \psi_l$ represents a phase difference between the $l^{th}$ path and an $1^{th}$ path.

9. A network device, comprising:
a processing module configured to obtain a plurality of paths that meet a multipath aggregation condition, wherein a spatial angle between every two paths in the plurality of paths is greater than or equal to an angle threshold, wherein the processing module is further configured to determine aggregation information based on the plurality of paths, and the aggregation information comprises information required by the network device to generate an aggregation path corresponding to the plurality of paths.

10. The network device according to claim 9, wherein the aggregation information comprises phase difference information, and the network device further comprises:
a transceiver module, configured to:
send a downlink reference signal to a terminal device, wherein the downlink reference signal is used by the terminal device to measure the plurality of paths; and
receive measurement information from the terminal device, wherein the processing module is further configured to:
determine the phase difference information based on the measurement information; and
perform, based on the phase difference information, phase compensation on a path corresponding to the phase difference information.

11. The network device according to claim 10, wherein the measurement information comprises the phase difference information determined by the terminal device; or
the measurement information comprises a vector index determined by the terminal device, wherein the vector index is used to indicate a vector corresponding to the plurality of paths, wherein the processing module being configured to determine the phase difference information based on the measurement information comprises:
searching for, based on the vector index, the vector corresponding to the plurality of paths, and determining the phase difference information based on the vector corresponding to the plurality of paths.

12. The network device according to claim 9, wherein the aggregation information comprises phase difference information, and the processing module is further configured to obtain the phase difference information in a sampling traversal manner.

13. The network device according to claim 12, wherein the processing module being further configured to obtain the phase difference information in a sampling traversal manner comprises:
traversing phase differences in a preset phase difference sampling range for each path, and separately calculating beam weights of a plurality of aggregation paths;
invoking the transceiver module to receive a beam quality measurement result from a terminal device, wherein the beam quality measurement result comprises a result obtained after the terminal device measures beam quality corresponding to a beam weight of each aggregation path in the beam weights of the plurality of aggregation paths;

selecting, based on the beam quality measurement result, a beam weight of an aggregation path having best beam quality from the beam weights of the plurality of aggregation paths; and
using, as the phase difference information, a plurality of sampling phase differences corresponding to the beam weight of the aggregation path having the best beam quality.

14. The network device according to claim 9, wherein the aggregation information further comprises a beam weight corresponding to the path and a power allocation coefficient corresponding to the path, and the processing module is further configured to:
obtain angle information, phase information, and energy information of each path in the plurality of paths;
determine, based on the angle information and the phase information of the path, the beam weight corresponding to the path; and
determine, based on the energy information of the path, the power allocation coefficient corresponding to the path.

15. The network device according to claim 14, wherein the processing module is further configured to:
perform normalization calculation on the beam weight corresponding to the path, the power allocation coefficient corresponding to the path, and the phase difference information, to generate the beam weight corresponding to the aggregation path.

16. The network device according to claim 15, wherein that the processing module is further configured to perform normalization calculation on the beam weight corresponding to the path, the power allocation coefficient corresponding to the path, and a phase difference corresponding to the path, to generate the beam weight corresponding to the aggregation path comprises:
calculating the beam weight corresponding to the aggregation path according to the following formula:

$$f_{L_0} = Q\left(\sum_{l=1}^{L_0} \beta_l * e^{j\Box\psi_l} * q_l\right),$$

wherein
$f_{L_0}$ represents the beam weight corresponding to the aggregation path, $Q(\bullet)$ represents a normalization function, $\beta_l$ represents a power allocation parameter of an $l^{th}$ path, $$\beta_l = \frac{|\alpha_l|}{\sum_{i=1}^{L_0} |\alpha_i|}, 1 \le l \le L_0,$$

$\alpha_l$ represents energy of the $l^{th}$ path, $q_l$ represents a beam weight of the $l^{th}$ path, and $\Box \psi_l$ represents a phase difference between the $l^{th}$ path and an $1^{th}$ path.

17. A non-transitory computer readable medium, wherein the non-transitory computer readable medium stores instructions that are executable by a computer, and the instructions comprise instructions for:
receiving a downlink reference signal from a network device, wherein the downlink reference signal is used by the terminal device to measure a plurality of paths and a spatial angle between every two paths in the plurality of paths is greater than or equal to an angle threshold; and sending measurement information to the network device, wherein the measurement information is used by the network device to determine phase difference information.

18. The non-transitory computer readable medium according to claim 17, wherein the measurement information comprises the phase difference information determined by the terminal device.

19. The non-transitory computer readable medium according to claim 17, wherein the measurement information comprises a vector index determined by the terminal device, wherein the vector index is used to indicate a vector corresponding to the plurality of paths.

* * * * *